Dec. 28, 1937.  J. R. BENFORD ET AL  2,103,230

MICROSCOPE ILLUMINATOR

Filed June 30, 1937

JAMES R. BENFORD
LEON V. FOSTER
INVENTORS

BY
ATTORNEYS

Patented Dec. 28, 1937

2,103,230

UNITED STATES PATENT OFFICE 2,103,230

MICROSCOPE ILLUMINATOR

James R. Benford, Rochester, and Leon V. Foster, Irondequoit, N. Y., assignors to Bausch & Lomb Optical Company, Rochester, N. Y., a corporation of New York Application June 30, 1937, Serial No. 151,200

3 Claims. (Cl. 88—40)

The present invention relates to microscope illuminators and more particularly to such illuminators for opaque illumination.

One of the objects of the present invention is to provide a microscope illuminator which can be rapidly and easily changed from a bright field to a dark field illuminator. Another object is to provide a selective bright or dark field illuminator for opaque objects. A further object is to provide such an illuminator having at its upper end means for attaching it to the body tube of a microscope and at its lower end, means for detachably holding a condenser and objective. These and other objects and advantages reside in certain novel features of construction, arrangement and combination of parts as will hereinafter be more fully set forth and pointed out in the appended claims.

Referring to the drawing.

Figure 2:
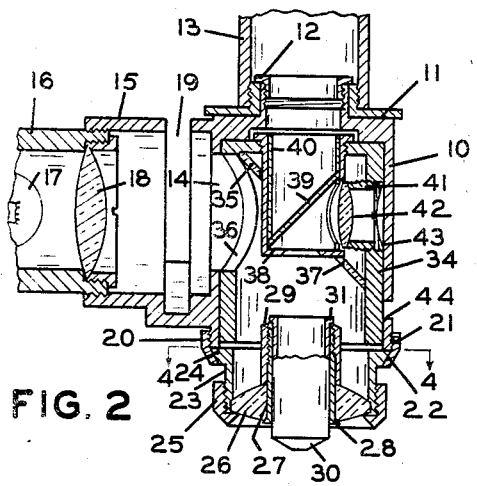
Fig. 2 is a vertical section thereof showing the arrangement for dark field illumination.
Figure 1:
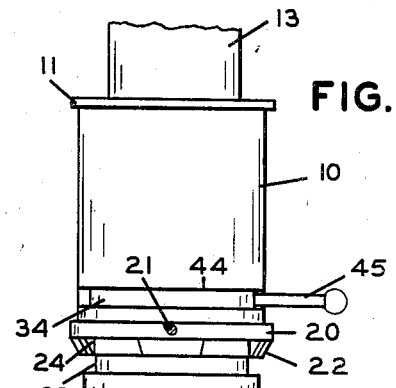
Fig. 1 is a front elevation of our improved illuminator.

In the preferred embodiment of our invention, as illustrated in the drawing, the illuminator consists of a casing 10 having a threaded ring 11 rotatably secured on the upper end thereof by a collar 12 for securing the casing 10 to the body tube 13 of a microscope. The microscope is conventional and hence only the body tube 13 is shown.

The casing 10 has an opening 14 in one side and an extension 15 on that side of the casing carries a lamp housing 16. A prefocused lamp 17 and condensing system 18 direct a concentrated beam of light into the casing 10. The extension 15 is formed with a slot 19 between the lamp housing 16 and casing 10 to receive the usual filters, polarizers or the like, not shown.

Figure 4:
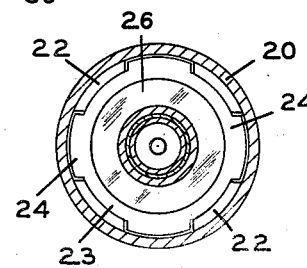
Fig. 4 is a section taken on line 4—4 of Fig. 2.

A ring 20 is secured at the bottom end of the casing 10 by a set screw 21 and has a plurality of inwardly inclined projections 22. A second casing 23 has a similar number of outwardly inclined lugs 24 for engaging the projections 22 and securing the casing 23 on the casing 10. Fig. 4 shows the lugs 24 and projections 22 in position for attachment or withdrawal of the second casing 23. Fastened in the casing 23 by means of a ring 25, is a condenser 26 provided with a central aperture 27 within which a metal bushing 28 is fixed by means of a collar 29. The objective 30 is slidable within the bushing 28 and is provided with a shoulder 31 which engages the bushing 28 and positions the objective so that it is parfocal with the condenser 26. The objective 30 is, of course, positioned so that it is coaxial with the microscope body tube 13.

Figure 5:
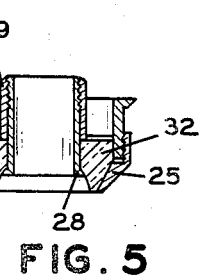
Fig. 5 is a vertical section of the condenser mount showing a reflecting condenser.

Fig. 5 shows the reflecting type of condenser. In this form, the condenser is made as an annular ring of glass 32 having a reflecting surface 33. The bushing and bushing mount are identical with those of the lens 26 and the two condenser casings are interchangeable, the particular condenser to be used depending upon the objective required.

A cylinder or housing 34 is rotatably mounted within the casing 10 for rotation about the optical axis of the microscope. Within this housing 34 is fixed a silvered reflector 35 which is in alignment with the window 36 and is inclined so as to direct the light beam from the lamp 17 downwardly to the condenser 26. The reflector 35 is provided with a central aperture 37 in alignment with the objective 30 so that the image forming rays from the objective 30 may pass up into the body tube 13 to the microscope observation system, not shown.

A tubular support 38 open at both top and bottom is threaded in the top of the cylinder or housing 34 and extends downward through the opening 37 in the reflector 35. Within this support 38, a semi-reflecting transparent plate 39 is secured by a cylindrical cell 40. The plate 39 is mounted at an angle equal and opposite to the angle of inclination of the reflector 35. A cell 41 carrying a lens 42 is threaded in a second window 43 in the cylinder 34 opposite the window 36. This lens 42, together with the condensing system 18, serves to focus the condenser 18 virtually in the image plane of the objective 30.

The casing 10 is provided with an arcuate slot 44 through which extends an operating handle 45 secured to the cylinder or housing 34. The slot 44 is of such length that moving the handle 45 from one extreme position to the other presents either the window 36 or the window 43 to the light beam.

Figure 3:
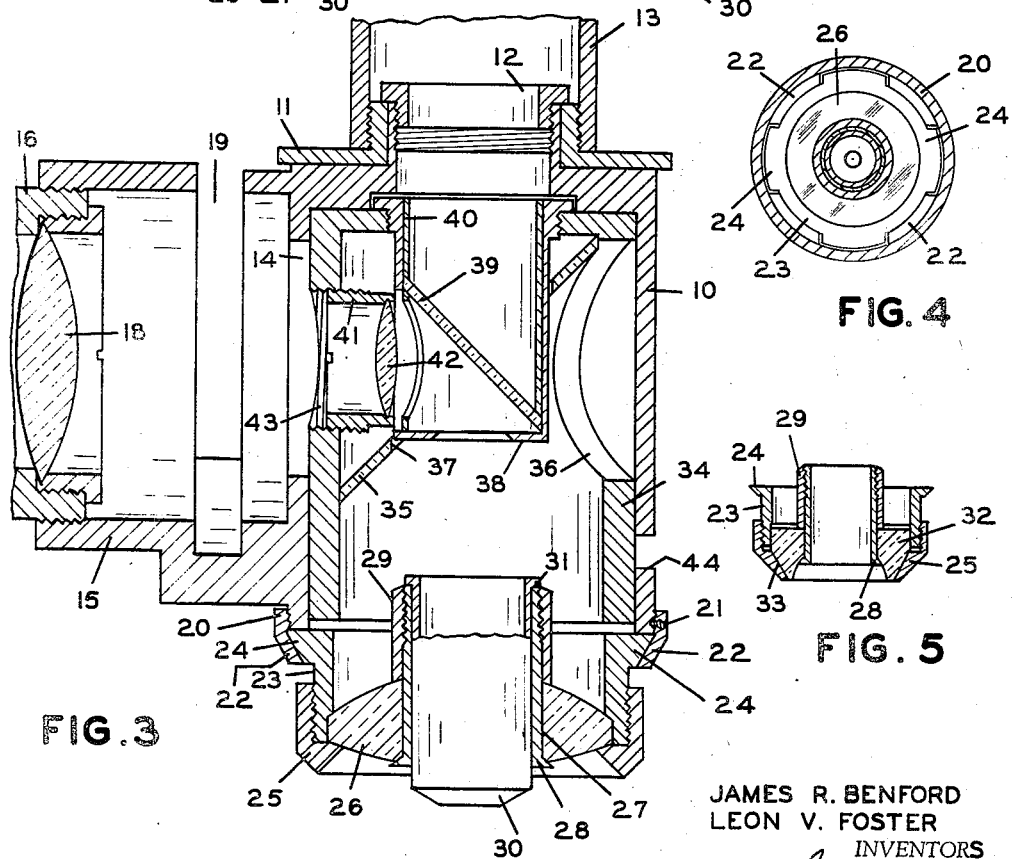
Fig. 3 is a vertical section thereof showing the arrangement for bright field illumination.

Fig. 2 shows the cylinder 34 in the position for dark field illumination. In this position of the casing 34, the light from the illuminating system is reflected downward in a hollow cylinder by the reflector 35 to the condenser 26, thus giving dark field illumination. For bright field illumination, the handle 45 is moved through 180 degrees so that the cylinder 34 takes the position shown in Fig. 3. The light from the lamp 17 is condensed by the condensing system 18 and the lens 42 focuses the condenser 18 virtually at the same distance from the objective 30 as the image plane so that the objective 30 focuses the evenly illuminated condenser 18 at its own object plane.

From the foregoing, it will be apparent that we are able to attain the objects of our invention and provide a vertical illuminator which can be readily and rapidly changed from a dark field to a bright field illuminator. Various modifications can, of course, be made without departing from the spirit of our invention or the scope of the appended claims:

We claim:

1. An illuminator for attachment to the body tube of a microscope, said illuminator comprising a casing having means for attaching it to said body tube, a second casing secured at the lower end of the first casing, a light condensing element having a central aperture secured in said second casing, an objective mounted in said aperture in alignment with said body tube, a housing rotatably mounted in said first casing above said second casing, an inclined annular reflector mounted in said housing in alignment with said condensing element, a semi-reflecting element mounted in said housing in alignment with said objective at an inclination opposite to that of said annular reflector, said casing having an opening in one side thereof to admit light to said housing and means for rotating said housing to present selectively said annular reflector or said semi-reflecting element to the opening in said casing.

2. A microscope illuminating system for selective bright field or dark field illumination, comprising a casing having means for attaching it to the body tube of a microscope, a second casing secured to the first casing, a transparent condensing element having a central aperture therethrough secured in said second casing, means carried by said element for mounting a microscope objective in axial alignment with said body tube, means for directing a beam of light into said first casing from one side, a cylinder rotatably mounted within said first casing with its axis substantially coincident with the optical axis of the microscope, an inclined reflector having a central aperture therethrough mounted in said cylinder to direct said beam of light to said condensing element, a transparent reflector mounted in said cylinder in alignment with said objective, the transparent reflector being mounted at an angle equal and opposite to that of the inclined reflector, and means for rotating said cylinder in said casing to selectively present one or the other of said reflectors to said light beam.

3. A microscope illuminating system for selective bright field or dark field illumination, comprising a casing having means for attaching it to the body tube of a microscope, a second casing secured to the first casing, a transparent condensing element having a central aperture therethrough secured in said second casing, means carried by said element for mounting a microscope objective in axial alignment with said body tube, means for directing a beam of light into said first casing from one side, a cylinder rotatably mounted within said first casing with its axis substantially coincident with the optical axis of the microscope, an inclined reflector having a central aperture therethrough mounted in said cylinder to direct said beam of light to said condensing element, a transparent reflector mounted in said cylinder in alignment with said objective, the transparent reflector being mounted at an angle equal and opposite to that of the inclined reflector, a lens mounted in said cylinder in fixed alignment with said transparent reflector for focusing the light beam in the image plane of said objective, and means for rotating said cylinder in said casing to selectively present one or the other of said reflectors to said light beam.

JAMES R. BENFORD.
LEON V. FOSTER.